United States Patent
Yang et al.

(10) Patent No.: US 8,787,916 B2
(45) Date of Patent: Jul. 22, 2014

(54) HANDOVER DECISION METHOD IN WIRELESS COMMUNICATION SYSTEMS AND APPARATUS THEREOF

(75) Inventors: Jin Gil Yang, Gyeonggi-do (KR); Ki Tae Lee, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 334 days.

(21) Appl. No.: 12/817,437

(22) Filed: Jun. 17, 2010

(65) Prior Publication Data

US 2010/0323702 A1    Dec. 23, 2010

(30) Foreign Application Priority Data

Jun. 17, 2009  (KR) .................. 10-2009-0053916

(51) Int. Cl.
*H04W 36/00*    (2009.01)

(52) U.S. Cl.
USPC .......................................... 455/441; 455/440

(58) Field of Classification Search
USPC ............. 455/404.2, 414.1, 414.2, 432.1–444, 455/456.1–456.6, 457, 67.16, 115.3, 134, 455/135, 161.3, 226.1–226.3, 504, 506, 455/238.1, 242.1, 242.2, 550.1, 552.1, 455/553.1, 556.1, 556.2, 418–422.1; 370/310.2, 328, 331–334, 338, 370/352–356, 508, 519
See application file for complete search history.

(56) References Cited

U.S. PATENT DOCUMENTS

| | | | | |
|---|---|---|---|---|
| 6,038,444 | A * | 3/2000 | Schipper et al. | 455/421 |
| 6,052,598 | A * | 4/2000 | Rudrapatna et al. | 455/456.1 |
| 6,075,990 | A * | 6/2000 | Shin | 455/440 |
| 6,351,642 | B1 * | 2/2002 | Corbett et al. | 455/442 |
| 6,741,863 | B1 * | 5/2004 | Chiang et al. | 455/456.1 |
| 7,254,401 | B2 * | 8/2007 | Keranen et al. | 455/456.1 |
| 7,957,352 | B2 * | 6/2011 | Vanghi et al. | 370/335 |
| 2007/0072553 | A1 * | 3/2007 | Barbera | 455/67.11 |

OTHER PUBLICATIONS

"Measuring Round Trip Times to Determine the Distance between WLAN Nodes" by Andre Gunther and Christian Hoene, Telecommunication Networks Group (TKN), TU-Berlin, Germany; IEEE, May 2005.*

* cited by examiner

*Primary Examiner* — San Htun
(74) *Attorney, Agent, or Firm* — Cha & Reiter, LLC.

(57) ABSTRACT

A method decides when to perform a handover in a wireless communications system, which includes the steps of checking a handover information between a network and a mobile terminal; determining a portability of the mobile terminal based on the handover information; and determining whether to perform the handover for the mobile terminal when a service disconnection is anticipated or estimated based on portability of the mobile terminal.

8 Claims, 4 Drawing Sheets

HANDOVER DECISION METHOD IN WIRELESS COMMUNICATION SYSTEMS AND APPARATUS THEREOF

CLAIM OF PRIORITY

This application claims the benefit under 35 U.S.C. §119 (a) of a Korean patent application filed in the Korean Intellectual Property Office on Jun. 17, 2009 and assigned Serial No. 10-2009-0053916, the entire disclosure of which is hereby incorporated by reference.

BACKGROUND OF THE INVENTION

1. Field of the Invention

The present invention relates to a handover method in a wireless communications system, and more particularly, to a handover method for deciding the execution of a hand-over in consideration of portability of mobile terminal which is moving with a high speed, and an apparatus thereof.

2. Description of the Related Art

A wireless communication technology is continuously being developed to enhance data rate and to support rapid mobility. Presently, the wireless communications technology approached a level of supporting data rate adequate enough to support wireless internet despite of problems associated with noise and fading. Wireless communications systems use different method due to different standardization, and such wireless communications technologies have both merits and demerits. For example, when cellular method and Wireless Local Area Network (WLAN) method are compared, the cellular method has a broader service coverage and high mobility support for mobile terminal while having relatively lower data rate than wireless LAN method. Meanwhile, the wireless LAN method has a higher data rate while having a narrower service coverage and lower mobility support for mobile terminal than the cellular communications method.

Thus, recently, mobile terminals of multi-mode that supports a wireless communications technology of different methods are developed. A handover between wireless communications technologies with different methods is supported such multi-mode terminal. The handover which is generated in the movement between cells formed by a base station having the same communications method is called horizontal handover. On the other hand, the handover which is generated between different networks in the environment in which various different networks exist is called vertical handover. Recently, various vertical handover techniques for providing continuous handover between different networks are developed and proposed. Accordingly, in deciding a handover for a mobile terminal, an improved method different from the existing method is needed to better service the users.

SUMMARY OF THE INVENTION

The present invention has been made in view of the above problems, and provides an efficient handover decision method for a mobile terminal of a wireless communications system, and an apparatus thereof.

The present invention further provides a handover method capable of estimating a portability of a mobile terminal in a wireless communications system, checking the possibility of handover of a corresponding mobile terminal according to the portability of the mobile terminal on a real time basis and performing the handover when a certain condition is met, and an apparatus thereof.

The present invention further provides a handover method capable of determining the service availability for a mobile terminal by using a handover information between the mobile terminal and a network, and deciding the handover for a corresponding mobile terminal according to the service availability, and an apparatus thereof.

The present invention further provides a handover method capable of determining the continuous availability of service for a corresponding mobile terminal in consideration of the portability of the moving mobile terminal, and deciding the execution of handover of a corresponding mobile terminal, and an apparatus thereof.

The present invention further provides a handover method capable of obtaining a movement information of a mobile terminal by using a propagation delay time between network and mobile terminal without a separate hardware such as a satellite navigation equipment, and deciding the handover for a corresponding mobile terminal according to the service availability for a mobile terminal which is determined using the movement information, and an apparatus thereof.

In accordance with an aspect of the present invention, a method for performing a handover in a wireless communications system, includes: detecting a handover information between a network and a mobile terminal; determining a portability of the mobile terminal based on the handover information; and determining whether to perform the handover for the mobile terminal when a service disconnection is estimated based on the portability of the mobile terminal.

In accordance with another aspect of the present invention, an apparatus for performing a handover in a wireless communications system, includes: a propagation delay measuring unit that measures a propagation delay time between a network and a mobile terminal; a portability estimation unit that estimates a location information, a distance information, a speed information of the mobile terminal by using the measured propagation delay time, and a to serviceable time between the mobile terminal and the network based on the estimated speed information and a service area of the network; and a handover decision unit that decides whether to perform the handover based on the estimated serviceable time.

BRIEF DESCRIPTION OF THE DRAWINGS

The above features and advantages of the present invention will be more apparent from the following detailed description in conjunction with the accompanying drawings, in which.

DETAILED DESCRIPTION OF THE INVENTION

Figure 1:
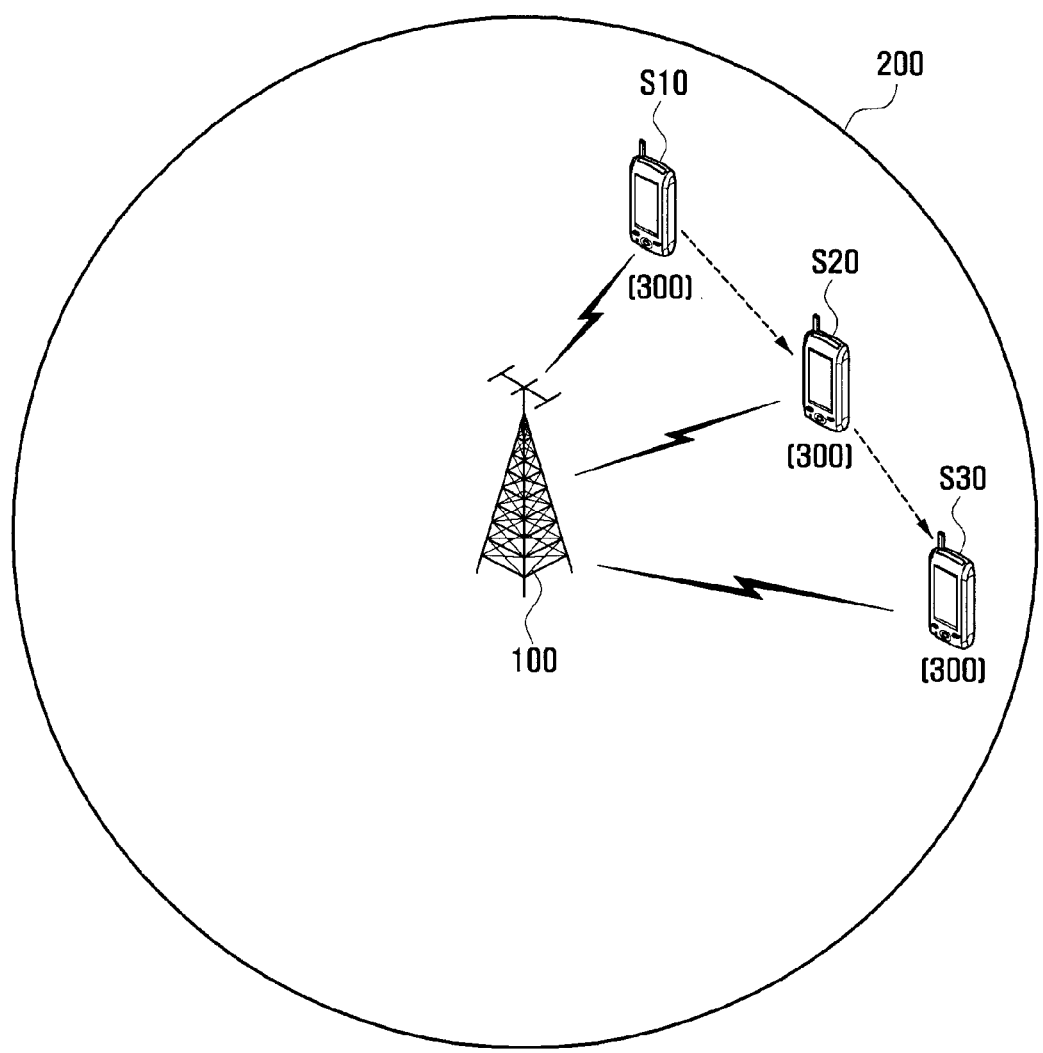
FIG. 1 is a schematic system configuration for illustrating a handover process according to an exemplary embodiment of the present invention.

Hereinafter, exemplary embodiments of the present invention are described with reference to the accompanying drawings in detail. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

The teachings of the present invention relates to a handover method for deciding when to perform the handover for a corresponding mobile terminal by using a handover information obtained through a specific message exchange between network and mobile terminal, and an apparatus thereof.

Generally, the handover can be performed through following stages: a handover monitoring, a handover decision, and a handover execution. The handover monitoring represents a process of collecting all information necessary for handover. The handover decision represents a process of deciding the time of handover and the appropriate network connection for a corresponding mobile terminal according to the result of handover monitoring. The handover execution represents a process of actually performing the handover based on outcome of the handover monitoring and the handover decision.

In the embodiment of the present invention, a portability characteristic of the mobile terminal, such as location of the terminal within a coverage area of a network, speed of terminal traveling within the network, and distance information as the terminal moves within the network, can be determined or estimated using a handover information obtained in the handover monitoring, then whether to perform the handover for the mobile terminal can be decided according to the estimated portability characteristic.

The handover information can be obtained from an exchange of a message between the network and the mobile terminal. The handover information in the embodiment of the present invention can include a propagation delay time and a point of time of propagation delay time measurement as well as the location information, the distance information, and the speed information of the mobile terminal.

According to an exemplary embodiment of the present invention, the location information of mobile terminal can be determined through the propagation delay time, and the distance information can be acquired by using a difference between the location information between the movement of a mobile terminal. The speed information of the mobile terminal can be acquired by using the distance information. Then, a serviceable time for the mobile terminal is obtained by the speed information.

Thereafter, it is determined whether service is possible for the mobile terminal by comparing the serviceable time with a set critical value. In case the serviceable time is a critical value or less, the handover for the mobile terminal is decided to be performed. The critical value can indicate an estimated time of service disconnection that may occur while the terminal is deviating from the service area (i.e., coverage) of network.

As explained in detail hereinafter, according to an exemplary embodiment of the present invention, the portability of the mobile terminal can be estimated by using a handover information defined without using a separate location measurement unit, then the service availability for a corresponding mobile terminal can be estimated based the portability information. Finally, whether to perform the handover for a corresponding mobile terminal can be determined based on the service availability.

Hereinafter, the handover method according to an exemplary embodiment of the present invention is reviewed. However, it should be noted that the handover method of the present invention is not limited to the below description, but can be applied to various embodiments based on the below embodiments.

FIG. 1 is a schematic system configuration for illustrating a handover process according to an exemplary embodiment of the present invention.

Referring to FIG. 1, a mobile terminal 300 is located in a service area 200 covered by a network 100, and roams in the direction of fading away from the service area 200 of the network 100. Here, the mobile terminal 300 can be a terminal which supports at least two wireless communications system interfaces so as to connect to each network supporting a wireless communications technology of a different method.

For illustrative purposes, FIG. 1 illustrates one wireless communications system, but it should be noted that the present invention is not limited to this and can be implemented by a wireless communications system consisting of the same kind networks and a wireless communications system consisting of two or more different kind networks.

In the meantime, various consideration factors can be included in the wireless communications system in order to decide the hand-over execution that can minimize a packet loss and a call drop phenomenon of the mobile terminal 300 existing in the service area 200 of the network 100. Various elements (e.g., network load, moving speed of mobile terminal) that the mobile terminal 300 has to perform the handover can exist in addition to a positional factor of the mobile terminal 300.

As the mobile terminal 330 moves (from S20 to S30), the network 100 obtains handover information and determines the portability of the mobile terminal 300 by comparing the handover information (first information) of the mobile terminal obtained at S10 location with the handover information (second information) of the mobile terminal 300 obtained at S20 location. At the same time, the network 100 checks the service availability according to the portability of the mobile terminal 300, and maintains the service connection with the mobile terminal 300 when service is possible. Similarly, the network 100 can determine the portability of the mobile terminal 300 by comparing the handover information (first information or second information) of the mobile terminal obtained at S10 or S20 location with the handover information (third information) of the mobile terminal 300 obtained at S30 location. The network 100 checks the service availability according to the portability of the mobile terminal 300. At this time, when determining that the measured serviceable time is a set critical value or less, the network 100 decides the hand-over execution for the mobile terminal 300.

Hereinafter, the handover decision method of the present invention is illustrated in detail with reference to FIG. 2 to FIG. 4.

Figure 2:
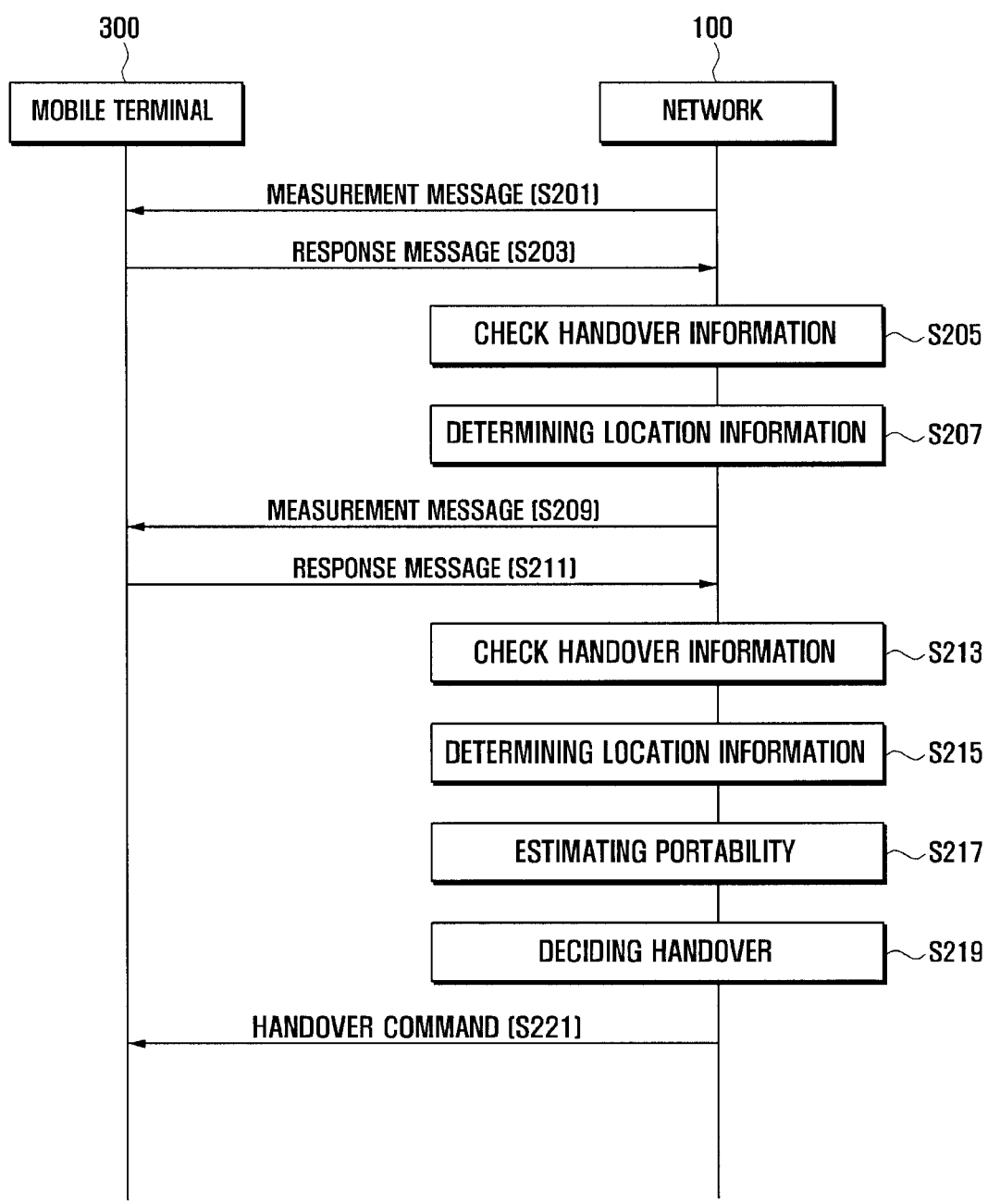
FIG. 2 is a handover process in a system according to an exemplary embodiment of the present invention.

FIG. 2 is a handover process in a system according to an exemplary embodiment of the present invention. FIG. 2 shows the operation of deciding the handover for the mobile terminal in network. However, the present invention is not limited to decide handover in a network, and can include the operation of deciding handover by the mobile terminal and transmitting a handover request to network.

Firstly, the network 100 and the mobile terminal 300 perform a handover monitoring process. For example, as a process for checking the handover for the mobile terminal 300, the network 100 periodically transmits a measurement message to the mobile terminal 300 (S201, S209), and the mobile terminal 300 transmits a response message to the network 100 in response to the measurement message of the network 100 (S203, S211). Hereinafter, it is assumed that a first measurement of the exchange of a message which is periodically sent and received is achieved in the location of the reference numeral S10 in FIG. 1, and a second measurement is achieved in the location of the reference numeral S30.

Referring to FIG. 2, the network 100 can transmit the measurement message to the mobile terminal 300 during a cycle, which is set for the handover monitoring (S201). In response, the mobile terminal 300 transmits a response message to the network 100 (S203). Here, it is assumed that the exchange between the measurement message and the response message is achieved for the first time at step 201 and step 203. For example, the mobile terminal 300 enters the service area 200 supported by the network 100 to indicate an initial point of time when performing communication with the network 100.

Next, if the network 100 receives the response message from the mobile terminal 300, it can check for a need for handover by using a time required for the exchange of the measurement message and the response message (S205). Particularly, the network 100 checks the propagation delay time T1 during the exchange with the mobile terminals 300. The propagation delay time can be made through the measurement of TOA (Time Of Arrival) between the network 100 and the mobile terminal 300. The network 100 also calculates the point of time when measuring the propagation delay time T1. The network 100 further determines the location information L1 of the mobile terminal 300 by using the propagation delay time T1 (S207).

Accordingly, the network 100 stores the first information such as the propagation delay time T1, the point of time when measuring the propagation delay time T1, and the location information L1.

Thereafter, the network 100 can transmit a measurement message to the mobile terminal 300 during a cycle, which is set for a periodic handover monitoring (S209). In response, the mobile terminal 300 transmits a response message to the network 100 (S211). Next, the network 100 can check the handover information by using a time required for the exchange of the measurement message and the response message when receiving the response message from the mobile terminal 300 (S213).

Particularly, the network 100 can check the propagation delay time T2 to and from the mobile terminals 300. The propagation delay time can be made through the measurement of TOA (Time Of Arrival) according to the message exchange between the network 100 and the mobile terminal 300. At this time, the network 100 calculates the point of time when measuring the propagation delay time T2. Then, the network 100 determines the location information L2 of the mobile terminal 300 by using the propagation delay time T2 (S215).

Accordingly, the network 100 stores the second information such as the propagation delay time T2, the measurement time of the point of time when measuring the propagation delay time T2, and the location information L2.

The network 100 estimates portability for the mobile terminal 300 by using the first and second information which are previously measured and stored in the above (S217). Here, the network 100 measures the movement variation of the mobile terminal 300 by using a difference between the location information L1 of the first information and the location information L2 of the second information. The speed information according to the movement variation of the mobile terminal 300 can be estimated by using the movement variation and the measured the point of time when measuring the propagation delay time T1 of the first information and the measured point of time when measuring the propagation delay time T2 of the second information. That is, the network 100 can estimate the speed information by calculation using a difference between the measurement time of the propagation delay time T1 and the measurement time of the propagation delay time T2. Further, the network 100 can obtain information regarding a movement direction of the mobile terminal 300 based on the movement variation of the mobile terminal 300, in addition to the speed information.

Next, the network 100 decides a handover for the mobile terminal 300 according to the portability estimation result of the mobile terminal 300 (S219). Particularly, the network 100 decides handover in consideration of the movement speed of the mobile terminal 300. To this end, the network 100 estimates a serviceable time when the mobile terminal 300 can exist in the network 100's own service area 200, and can determine continuous service availability for the mobile terminal 100 in response to the serviceable time. That is, the network 100 checks the serviceable time for the mobile terminal 300 based the portability estimation determined above, i.e., based on the movement variation, the speed and the network's own coverage information, and then decides the handover based on the serviceable time.

If the network 100 determines that handover is needed, the network 100 generates a handover command directing the handover execution to the mobile terminal 300, and transmits the handover command to the mobile terminal 300 (S221). As a result, the network 100 and the mobile terminal 300 can perform a handover process with one of adjacent neighbor networks in response to the handover command.

Figure 3:
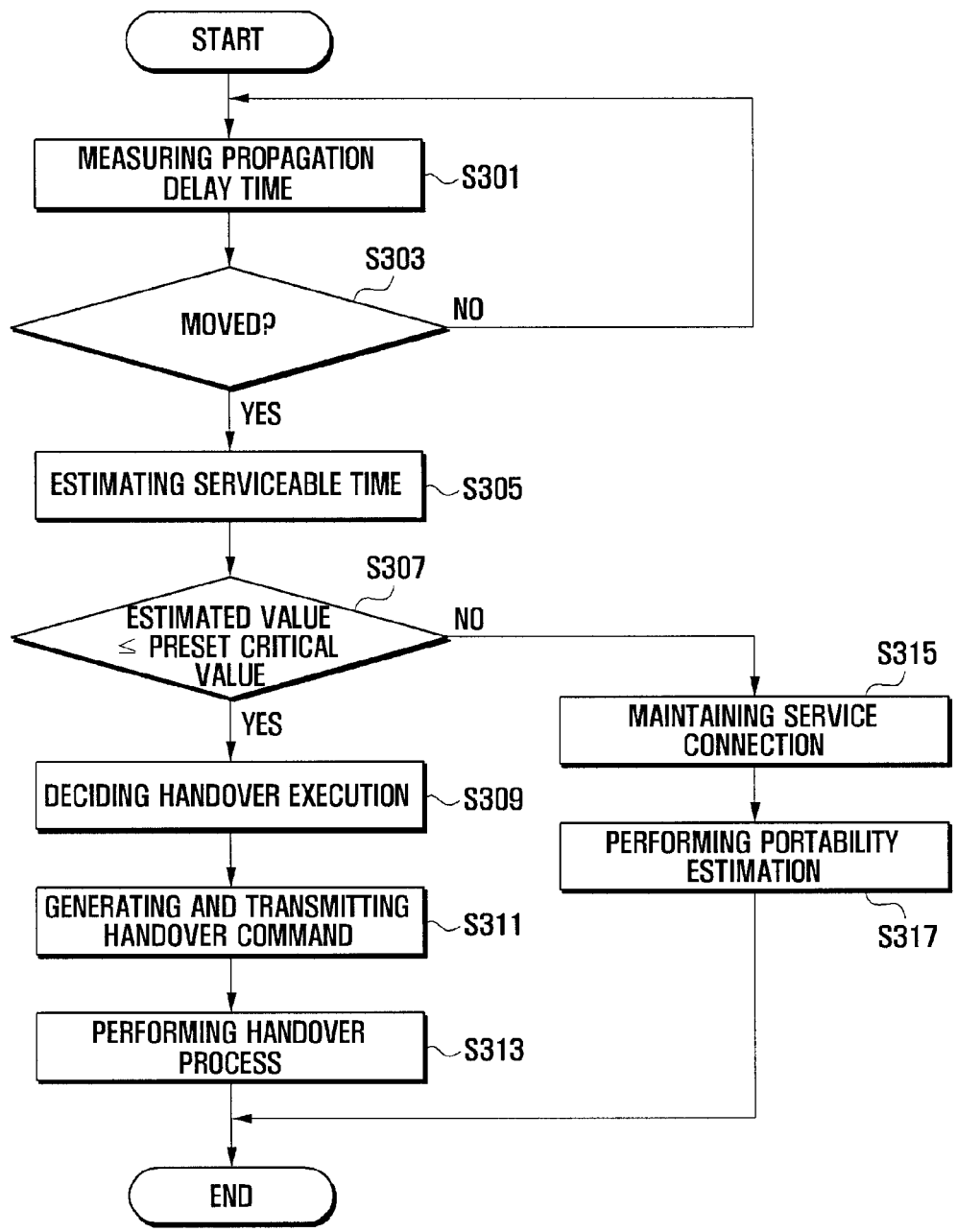
FIG. 3 is a handover decision process in a network according to an exemplary embodiment of the present invention.

FIG. 3 is a handover decision process in a network according to an exemplary embodiment of the present invention.

Referring to FIG. 3, the network 100 can periodically measure the propagation delay time for at least one mobile terminal within its own service area 200, i.e., within coverage (S301). At this time, as described above, the network can determine the portability for respective mobile terminals by using two values obtained through a periodic propagation delay time measurement (S303).

For example, the portability for a corresponding mobile terminal can be determined by using a difference between the propagation delay time which is currently measured and the propagation delay time which is previously measured for a specific mobile terminal. Here, the network 100 can obtain location information for a corresponding mobile terminal through the propagation delay time measurement, and can check the portability pattern for a corresponding mobile terminal by using a difference between location information which are periodically obtained.

Next, as a result of the determination, when portability is not checked for the mobile terminals existing in the network 100's own service area 200, the network 100 can periodically perform the operation of determining the portability for at least one mobile terminal which exists within its own service area. At this time, the network transmits a measurement message in every set cycle, and can determine the portability for the mobile terminal through a response message of the mobile terminal sent through an uplink channel.

On the other hand, as a result of the determination, a portability for a specific mobile terminal is sensed, the network 100 estimates a serviceable time for a corresponding mobile terminal (S305), and compares the estimated service time value with a preset critical value (S307). At this time, the network 100 can obtain a difference of distance according to the movement of the mobile terminal by using the propagation delay time. Then, the network 100 can generate the speed of the mobile terminal by using the difference of distance and the measurement time for a corresponding mobile terminal.

Thereafter, the network 100 computes the speed and the network 100's own coverage to obtain a serviceable time (the estimated service time value) that is remained within the given coverage area by the network. Next, the network 100 can compare the obtained serviceable time (the estimated service time value) with the set critical value. As a result of the comparison at step 307, in case the serviceable time is greater than the set critical value, the network 100 determines that the service connection is maintained (S315), and can continuously perform the portability estimation process for the above-described mobile terminal (S317).

On the other hand, if the serviceable time is smaller than the set critical value in step 307, the network 100 can decide that hand-over should be executed (S309). That is, in case the serviceable time is sufficient (the estimated service time value>the preset critical value) in view of the portability of the mobile terminal, the network 100 determines that the service for a corresponding mobile terminal can be maintained. In addition, in case the serviceable time is insufficient (the estimated service time value≤the preset critical value) when considering the portability of the mobile terminal, the network 100 determines that the service for a corresponding mobile terminal cannot be maintained, and decides to execute handover.

Next, if it is decided to execute handover, the network 100 generates a handover command which directs handover for a corresponding mobile terminal, and transmits the generated handover command to a corresponding mobile terminal (S311). Thereafter, the network 100 can perform a handover process for a corresponding mobile terminal with other adjacent network 100 (S313).

Until now, a portability of the mobile terminal and a serviceable time according to the portability was determined by using the propagation delay time with the mobile terminal in network with reference to FIGS. 1 to 3, and based on this, the operation of deciding handover for a corresponding mobile terminal was illustrated.

However, since the operation of the present invention is not limited to the above description, the handover decision according to an exemplary embodiment of the present invention can be performed in the mobile terminal. That is, the operation that network performs in the above-described FIGS. 1 to 3 can be performed in the mobile terminal, and based on this, the mobile terminal's own handover can be decided, and handover decision can be requested to network. Next, hereinafter, a device configuration for handover decision of the present invention as shown in the above-described FIGS. 1 to 3 is illustrated.

Figure 4:
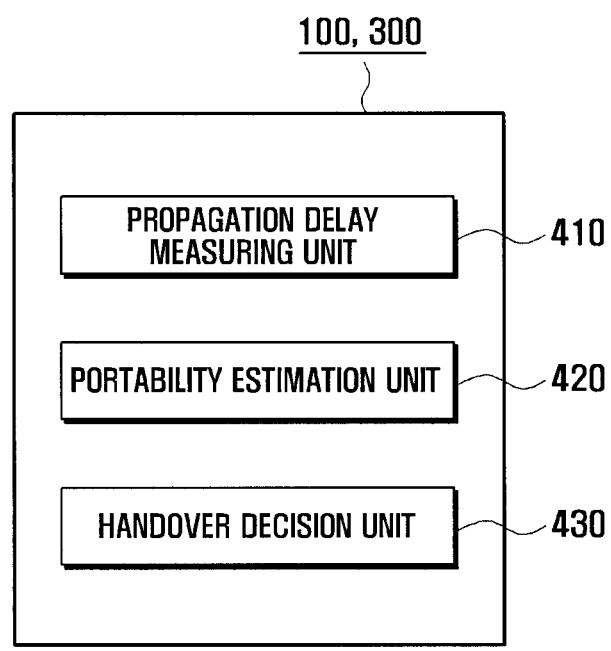
FIG. 4 is a schematic device configuration which can be included in a network or a mobile terminal according to an exemplary embodiment of the present invention.

FIG. 4 is a schematic device configuration which can be included in a network or a mobile terminal according to an exemplary embodiment of the present invention.

Particularly, the configuration like FIG. 4 can be implemented in one of portable terminal and network. And such configuration can be implemented based on software to perform handover decision of the present invention. Accordingly, it should be noted that the device configuration of the present invention is not limited to the below description, but can be applied to various embodiments based on a following embodiment.

Referring to FIG. 4, the network 100 or the mobile terminal 300 according to an embodiment of the present invention can include a propagation delay measuring unit 410, a portability estimation unit 420 and a handover decision unit 430. The propagation delay measuring unit 410 measures a propagation delay transmitted by the mobile terminal 300 and arrived in the network 100, or the propagation delay transmitted by the network 100 and arrived in the mobile terminal 300.

That is, the propagation delay measuring unit 410 measures a propagation delay time between the network 100 and the mobile terminal 300. The propagation delay measuring unit 410 can use the time of arrival (TOA) according to the transceiver of message between the network 100 and the mobile terminal 300. The portability estimation unit 420 estimates location information, distance information, and speed information of the mobile terminal 300 by using a propagation delay time measured in the propagation delay measuring unit 410, and, based on the estimated information, estimates a serviceable time between the mobile terminal 300 and the network 100. That is, the portability estimation unit 420 measures the movement speed of the mobile terminal 300 by using a measurement time of the point of time when measuring the propagation delay time between the network 100 and the mobile terminal 300, and continuously stores this into database and manages.

The handover decision unit 430 decides whether handover for the mobile terminal 300 should be executed based on the serviceable time estimated by the portability estimation unit 420. The handover decision unit 430 compares the serviceable time with a preset critical value. If the serviceable time is a critical value or less, that is, if a service disconnection is estimated in proportion to the portability of the mobile terminal, the handover decision unit 430 decides to execute handover.

Moreover, if the serviceable time is greater than the critical value, that is, if it is estimated that the service can be maintained even when the portability of the mobile terminal is considered, the handover decision unit 430 decides that the service connection is maintained. Moreover, the handover decision unit 430 can generate a handover command directing handover in response to the handover decision, and transmit a handover message. At this time, the handover message can be transmitted from the network 100 to the mobile terminal 300, or from the mobile terminal 300 to the network 100 according to a subject which determines handover of the present invention.

As described above, according to the handover decision method and apparatus in a wireless communications system suggested in the present invention, the movement information of the mobile terminal can be obtained without a separate measuring apparatus like satellite navigation equipment. Moreover, according to the present invention, the service availability of the mobile terminal according to the movement information can be estimated, and the handover for a corresponding mobile terminal can be decided according to the estimation result.

After all, handover for a mobile terminal which rapidly moves is estimated in advance and decided, the quality of service (QoS) according to wireless data communications of the mobile terminal can be improved. Moreover, a mobile terminal supporting multi-mode has an advantage of maximizing a merit according to the network characteristic of different kinds in a vertical handover method.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method for performing a handover in a wireless communications system, the method comprising:
   detecting handover information between a network and a mobile terminal, the handover information comprising a propagation delay time;
   determining a portability of the mobile terminal based on the handover information and by determining location information of the mobile terminal through use of the propagation delay time, obtaining distance information by using a difference between a first location information and a second location information of the mobile terminal, and estimating speed information of the mobile terminal by using the distance information and a point of time of a measurement of the propagation delay time;
   estimating a serviceable time for the mobile terminal, associated with a current service area of the network, based on the speed information and the current service area;
   determining whether to perform the handover for the mobile terminal when a service disconnection is estimated based on the portability of the mobile terminal and by comparing the serviceable time with a preset critical value;
   maintaining a service connection between the network and the mobile terminal when the serviceable time is greater than the preset critical value; and
   determining to execute the handover when the serviceable time is less than or equal to the preset critical value.

2. The method of claim 1, wherein the propagation delay is measured using a propagation delay measuring unit, the propagation delay being a propagation delay transmitted from the mobile terminal to the network, or a propagation delay transmitted from the network to the mobile terminal.

3. The method of claim 2, wherein the propagation delay is measured by the propagation delay measuring unit using a propagation arrival time based on an exchange of a message between the network and the mobile terminal.

4. The method of claim 3, further comprising:
   storing and managing, by a portability estimation unit, the movement information in a database.

5. The method of claim 1, further comprising:
   generating a handover command using a handover decision unit; and
   executing the handover using the generated handover command.

6. An apparatus for performing a handover in a wireless communications system, comprising:
   a propagation delay measuring unit that measures a propagation delay transmitted from the mobile terminal to the network, or transmitted from the network to the mobile terminal, using a propagation arrival time based on an exchange of a message between the network and the mobile terminal;
   a portability estimation unit that determines a portability of the mobile terminal based on the propagation delay and by determining location information of the mobile terminal through use of the propagation delay, obtaining distance information by using a difference between a first location information and a second location information of the mobile terminal, and estimating speed information of the mobile terminal by using the distance information and a point of time of a measurement of the propagation delay; and that estimates a serviceable time for the mobile terminal, associated with a current service area of the network, based on the speed information and the current service area; and
   a handover decision unit that determines whether to perform the handover for the mobile terminal when a service disconnection is estimated based on the portability of the mobile terminal and by comparing the serviceable time with a preset critical value; maintains a service connection between the network and the mobile terminal when the serviceable time is greater than the preset critical value; and determines to execute the handover when the serviceable time is less than or equal to the preset critical value.

7. The apparatus of claim 6, wherein the portability estimation unit stores and manages the estimated information in a database.

8. The apparatus of claim 6, wherein the handover decision unit generates a handover command to execute the handover.

* * * * *